F. J. FAULHABER.
TRACTOR AND TRAILER ASSEMBLAGE.
APPLICATION FILED DEC. 15, 1919.
1,383,709.
Patented July 5, 1921.
2 SHEETS—SHEET 1.
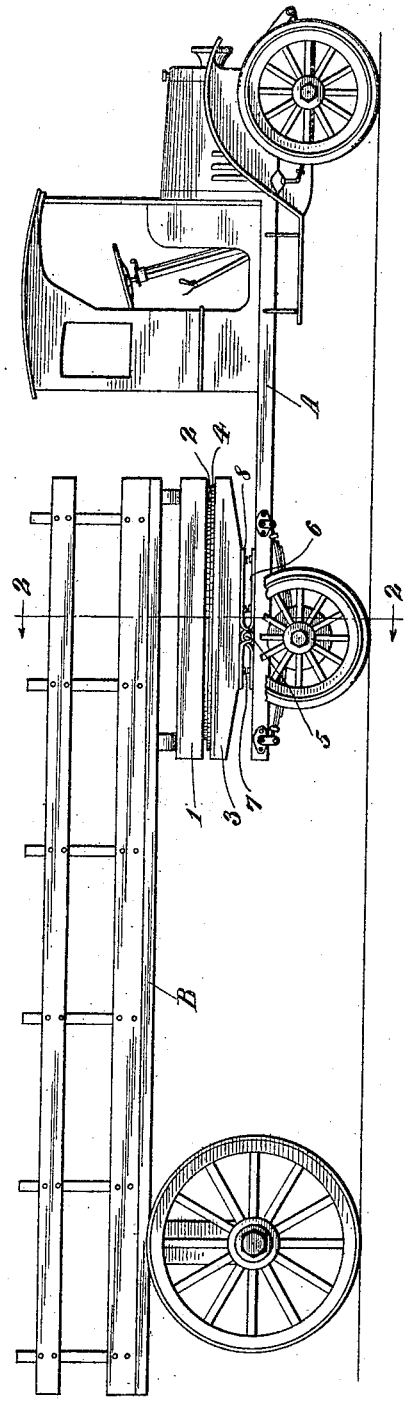
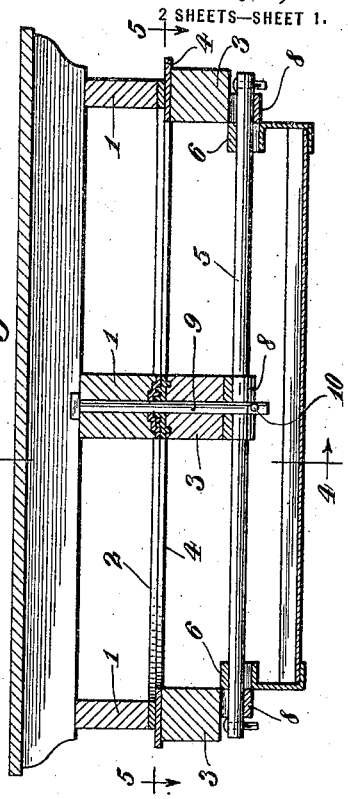
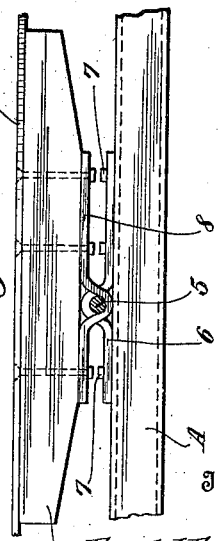
Inventor
Frank J. Faulhaber.
By Jas. H. Griffin
his Attorney

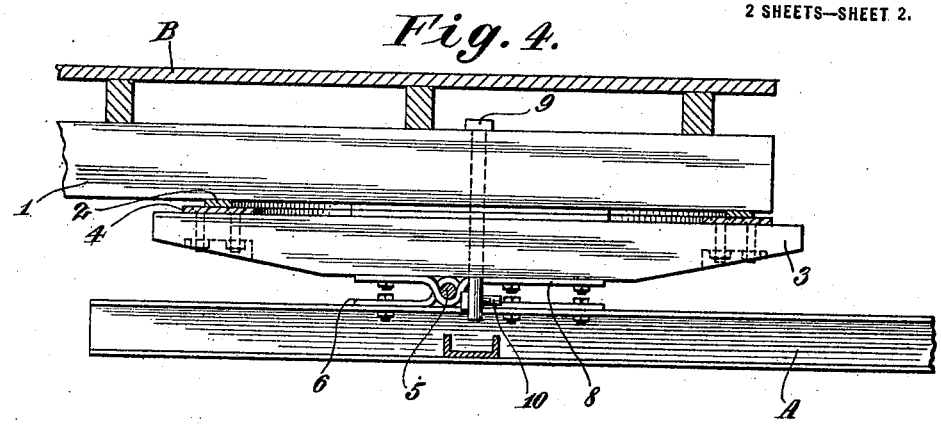
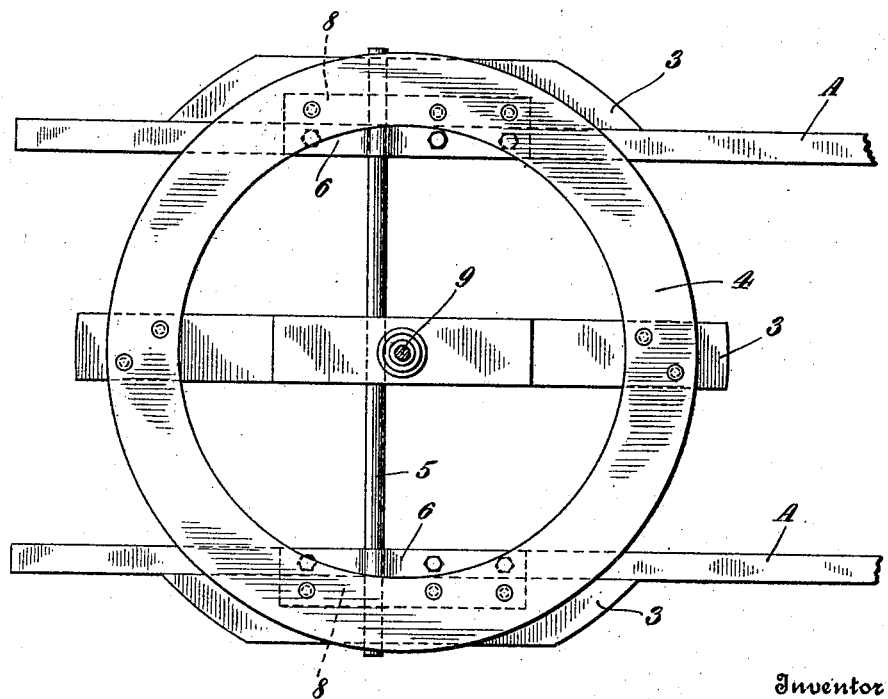

UNITED STATES PATENT OFFICE.

FRANK J. FAULHABER, OF NEW YORK, N. Y.

TRACTOR AND TRAILER ASSEMBLAGE.

1,383,709. Specification of Letters Patent. Patented July 5, 1921.

Application filed December 15, 1919. Serial No. 345,077.

*To all whom it may concern:*

Be it known that I, FRANK J. FAULHABER, a citizen of the United States, residing in New York city, borough of Manhattan, county and State of New York, have invented a certain new and useful Tractor and Trailer Assemblage, of which the following is a specification.

This invention relates to that class of vehicles wherein a tractor is adapted to be employed in conjunction with a trailer, and the present invention is directed to an improved manner of associating these two parts. It has long been the practice to associate a tractor with a trailer through the employment of fifth wheel construction, one half of the fifth wheel being mounted on the trailer, and the other half mounted on the tractor and maintained in engagement with the first half by a king-pin. It has been further suggested that in order to allow proper coöperation between the fifth wheel sections during the passage of the vehicle over rough roads, the fifth wheel section mounted on the tractor be supported for rocking movement thereon, and this construction has been the one generally employed. While the construction in question has gone into extensive use, it embodies many disadvantages.

One disadvantage inherent in the prior construction resides in the fact that the vertical axis of the king-pin intersects with the horizontal axis of rocking movement of the tractor fifth wheel section. I have found that vehicles so associated must be started or accelerated with more or less care, otherwise there results a tilting of one fifth wheel section relative to the other due to the pull of the tractor and the lag of the trailer.

The object of this invention is to overcome this relative tilting between the fifth wheel sections by positioning the axis of the king-pin forwardly of the axis of rocking movement of the tractor fifth wheel section and, I have found, in practice, that this arrangement will positively overcome the disadvantage referred to and enable the vehicle to be started more rapidly and with greater speed without fear of disorganizing, straining or disrupting the parts.

Features of the invention, other than those specified will be apparent from the hereinafter detailed description taken in conjunction with the accompanying drawings.

In the accompanying drawings, I have illustrated one practical embodiment of the invention, but the construction therein shown is to be understood as illustrative only, and not as defining the limits of the invention.

Figure 1 is a side elevation of a trailer and tractor assemblage embodying the present invention.

Fig. 2 is a transverse section on the line 2—2 of Fig. 1, certain parts being omitted in the interest of clearness.

Fig. 3 is an enlarged side elevation of a fragment of the construction of Fig. 1.

Fig. 4 is a section on the line 4—4 of Fig. 2; and,

Fig. 5 is a plan view of the tractor wheel section showing certain portions of the tractor which support the same.

In the accompanying drawings, A designates a tractor and B a trailer adapted to be associated therewith. The tractor A may vary in form of construction but is shown, for the purpose of illustration, in the well known form of a flat body motor car. The trailer B may also vary in form but preferably constitutes any well known form of horse driven vehicle from which the front truck has been removed.

Horse driven vehicles are usually provided on their forward end with a plurality of bolsters 1, which support an upper fifth wheel section 2, in the form of a flat ring, securely bolted or screwed to said bolsters and forming a part of the vehicle frame. This upper fifth wheel section is normally intended to coöperate with the fifth wheel section of the truck but, in accordance with the present invention, the truck is adapted to be removed and the forward part of the vehicle B supported on the after part of the tractor A. To permit of this association of vehicles, there is supported on the after part of the tractor A a plurality of bolsters 3 which extend fore and aft of the tractor and serve as a support for the lower fifth wheel section 4 which is secured thereto by means of bolts or otherwise.

The lower bolsters 3 are mounted for rocking movement on the tractor A on a transverse rod 5, which is secured to the frame of the tractor A, by means of straps or brackets 6 secured thereto by bolts 7 and said rod is secured to each of the bolsters 3 by means of small straps or brackets 8, as clearly shown in Figs. 2 and 3. The advantage of such construction is that, when the vehicles are passing over rough or uneven roads, the lower fifth wheel section 4 is adapted to partake of rocking movement so that the two fifth wheel sections 2 and 4 may remain, at all times, in proper face abutting contact. With the construction is associated a king-pin 9, which extends vertically through the center bolsters 1 and 3, as shown in Figs. 2, 4 and 5, and this pin is preferably locked against jumping out by slotting the lower end thereof and passing a key 10 through said slot and locking the key by a cotter pin.

It will be noted particularly from Fig. 4 that the longitudinal axis of the transverse rod 5 is positioned rearwardly of the vertical axis of the king-pin 9, and in practice this is a very important feature. Since, by such construction, the axis of rotation of the fifth wheel sections is positioned forwardly of the point of support of the forward portion of the trailer B the throwing of the balance forwardly of the line of support serves to hold the front of the trailer down when the tractor starts suddenly and the tendency of the fifth wheel sections to separate or their adjacent contacting faces to lift apart as is now the case in all trailer assemblages now in use is minimized. The tendency to bend the king-pin is thus largely overcome and jerking of the trailer on the king-pin during starting is avoided.

Having thus fully described the invention, what I claim as new and desire to secure by Letters Patent is:

1. A trailer and tractor assemblage embodying a tractor provided on the after portion thereof with a transverse shaft, a lower fifth wheel section mounted for rocking movement on said shaft, a trailer provided at its forward portion with an upper fifth wheel section adapted to coöperate with the fifth wheel section of the tractor, and a king-pin for maintaining the fifth wheel sections in juxtaposition, the axis of said shaft being positioned rearwardly of the axis of the king-pin, whereby the weight of the forward portion of the trailer carried by the tractor is thrown forwardly of the transverse axis of the shaft supporting such weight.

2. A trailer and tractor assemblage embodying a tractor, a fifth wheel section associated therewith, a trailer, a fifth wheel section associated therewith, a king-pin for maintaining the fifth wheel sections of both tractor and trailer in juxtaposition, and means mounting the fifth wheel section of the tractor for rocking movement on a transverse axis on the tractor with said transverse axis positioned rearwardly of the axis of the king-pin.

In testimony whereof, I have signed my name to this specification.

FRANK J. FAULHABER.